Inventor:
Bernard Maurice Hamel
By
Attorney

United States Patent Office 3,504,247
Patented Mar. 31, 1970

3,504,247
NON-LINEAR SERVO-CONTROL
Bernard Maurice Hamel, Paris, France, assignor to Societe Francaise d'Equipments pour la Navigation Aerienne, Neuilly-sur-Seine, Hauts-de-Seine, France, a joint-stock company of France
Filed Feb. 17, 1967, Ser. No. 616,866
Claims priority, application France, Feb. 23, 1966, 50,831
Int. Cl. G05b *13/02*
U.S. Cl. 318—18     5 Claims

ABSTRACT OF THE DISCLOSURE

A non-linear servo-control device, for which the equation of operation defining the variations of the controlled output magnitude $\beta$ as a function of the input variable or deviation $\alpha$ is not a linear differential equation, characterized by the fact that it comprises, in its direct chain, operational analogue circuits which produce linear transfer functions $x, y, z \ldots$ of the input variable or deviation $\alpha$, and a group of analogue circuits for constituting from the said transfer functions a linear intermediate variable of the type $$\alpha' = \sqrt[m]{|x^n||y^o||z^p|} \text{ sign } z$$

and such that the controlled output magnitude $\beta$ is a linear function of the said variable $\alpha'$.

---

The present invention relates to a non-linear servo-control device, and more especially to a paralinear device which profits simultaneously from the advantages of linear servo-control and those of non-linear servo-control.

When the output magnitude $\beta$ of a servo-control depends on a product of several functional values or transfer functions of the pilot variable or error $\alpha$, benefit is obtained from the advantages of flexibility and safety in operation required by the installation to be piloted and introduced by this multiple function, but on the other hand, the controlled magnitude $\beta$ is responsive to an unstable variation of the static conditions of equilibrium of the device to be controlled as as result of the cumulative non-linear nature of the product-function.

When a servo-control is linear, advantage is derived from a regular static equilibrium but, on the other hand, the operation is subject to the phase-gain relations of the linear servo-controls (Bode laws) which limit the effectiveness of the servo-control signal and also the zones of stability.

The present invention provides a servo-control device which is almost linear and which is termed paralinear in the present description, this control sharing in the advantages of the two above methods while at the same time eliminating their drawbacks:

It is practically linear;
It permits the introduction of any number of functional values of the piloting variable or error into the input of the servo-control;
It is not subjected to the limitative laws which relate the phase to the gain and which define the conditions of stability;
It is only slightly sensitive to variation of the static conditions of equilibrium of the system to be controlled and especially of the transmittance of the individual members of this system;
It is capable of linear transfer and of internal combination with pseudo-linear transfer.

This result is obtained by means of an electric analogue calculator which, in its most general form, resolves the general equation:

$$\beta = \text{sign of } z \sqrt[m]{|x^h y^o z^p|}$$

in which $m = n + o + p$, and $x = f_1(\alpha)$; $y = f_2(\alpha)$; $z = f_3(\alpha)$; $f_1, f_2$ and $f_3$ being linear functions of $\alpha$.

It is seen that the multiplication of $\alpha$ by a constant $\mu$ leads to the multiplication of $\beta$ by this same number $\mu$, which justifies the term paralinear adopted to qualify the laws which govern a servo-control of this kind and the advantageous features of the invention, the sign of $\beta$ being given in this case by the sign of $z$.

Other characteristic features and advantages will be brought out in the description which follows below with reference to the accompanying drawings and giving by way of indication but not in any limitative sense, one form of possible embodiment of the servo-control device according to the invention.

Figure 1:
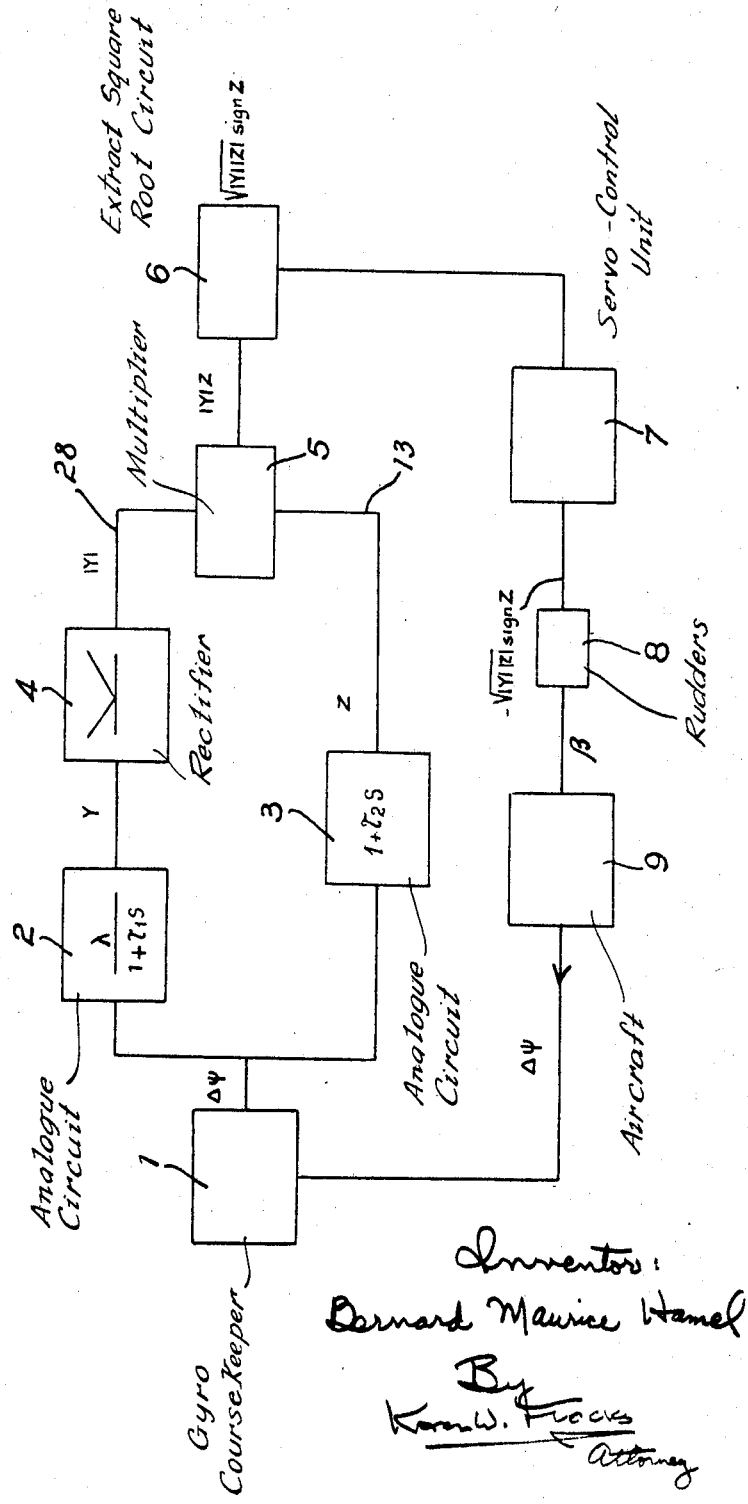
FIG. 1 is a schematic diagram of a servo-control installation for the course-setting of an aircraft, and which utilizes the servo-control device according to the invention.

In FIG. 1 there has been shown diagrammatically a servo installation for the course setting of an aircraft utilizing two transfer functions $y$ and $z$. In this case, the course error $\Delta \psi$ corresponds to the variable $\alpha$ of the general formula given above and $\beta$ represents the control amplitude or the angle of rotation of the steering rudder of the aircraft.

The intermediate transfer functions $y$ and $z$ are functions having the form:

$$y = \frac{\lambda \Delta \psi}{1 + \tau_1 s}$$

and $$z = \Delta \psi (1 + \tau_2 s)$$

in the usual notations of symbolic calculation, in which $s$ represents the differential symbol $d/dt$, and $\tau_1$ and $\tau_2$ values comparable to time constants, and $\lambda$ is the gain function.

It will then be noted that from the deviation or error $\Delta \psi$ there have been formed respectively in the operational analogue circuits 2 and 3, functions $y$ and $z$ for which $y$ varies essentially as a function of the gain, and for which $z$ varies essentially with the phase, $y$ and $z$ being linear functions of $\Delta \psi$.

It can be seen that by forming the product $|y|z$ there is obtained a non-linear function of $\Delta \psi$, and it is only necessary to extract the square root of this product in order to obtain a paralinear variable such as defined above.

The aircraft 9 supplies to the gyroscope station or gyroscope course-keeper 1 a deviation or error $\Delta \psi$ which is introduced on the one hand at 2 in order to produce the output $y$ and on the other hand at 3 in order to produce the output $z$.

The rectifier 4 supplies the absolute value $|y|$ or module of $y$ and the multiplier 5 introduces the product $|y|z$ into the circuit 6 which extracts the square root $\sqrt{|yz|}$ and transmits this with the sign of $z$ to the servo-control unit 7 which applies the corrective servo-control $\beta$ to the rudders 8 of the aircraft 9.

Figure 2:
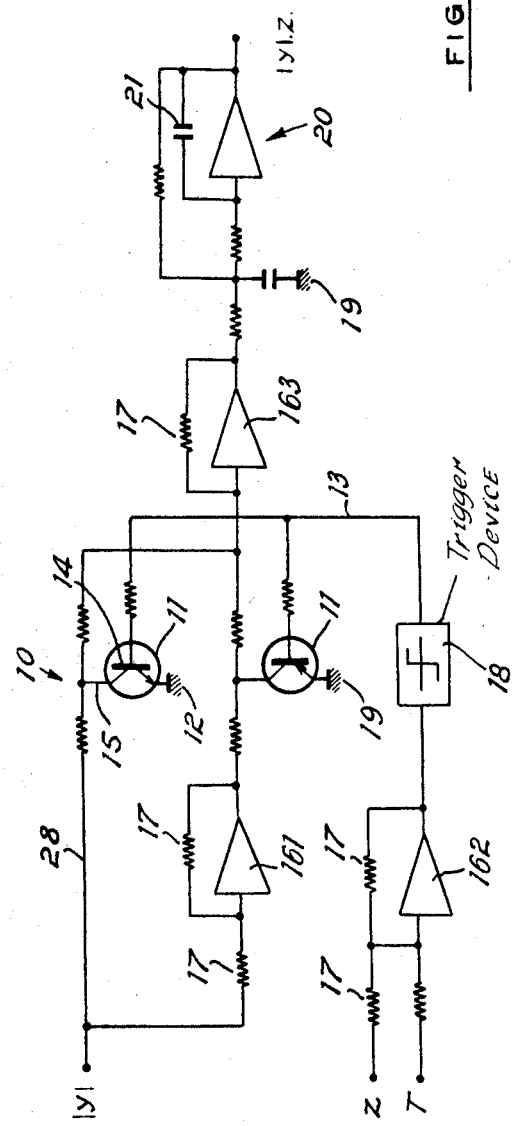
FIG. 2 is a diagram of a part of the analogue circuit or of the direct chain of the servo-control device such as illustrated in FIG. 1.

FIG. 2 shows diagrammatically one possible form of construction of the multiplier 5.

The operational amplifier 161 works as a phase shifter. $|y|$ and $-|y|$ are thus applied to the analogue gates constituted by the additional chopper transistors 11 and 14 associated with the adding amplifier 163. A gate is open if the corresponding chopper transistor is blocked and transversely. The opening or closure of the gates is controlled by the trigger device 18.

To the input T is applied a train of triangular waves of suitable amplitude and of high frequency with respect to those of $y$ and $z$, 1,000 cycles for example.

The adding and phase-shifting amplifier 162 carries out $-T-z$. At the output of the trigger unit 18, the widths of two successive square-top waves (one positive, the other negative) differ by an amount which is proportional to $z$.

There are thus obtained at the output of the amplifier 163, square-top waves of amplitude proportional to $|y|$, or $k|y|$, the widths of two successive square-top waves (one positive, the other negative) differing by $hz$, $h$ and $k$ being multiplying coefficients. The splitting-up of this signal into a Fourier series gives a relation having the form:

$$a_0 + \Sigma a_n \cos n\omega t + b_n \sin n\omega t$$

The second order filter 20 eliminates the alternating components.

A simple calculation shows that $a_0 = C|y|z$, where C is a multiplying constant. The result is that at the output of the active filter 20 there is obtained the product $|y|z$ which is furthermore represented by the difference of the surfaces of two successive square-top waves.

Figure 3:
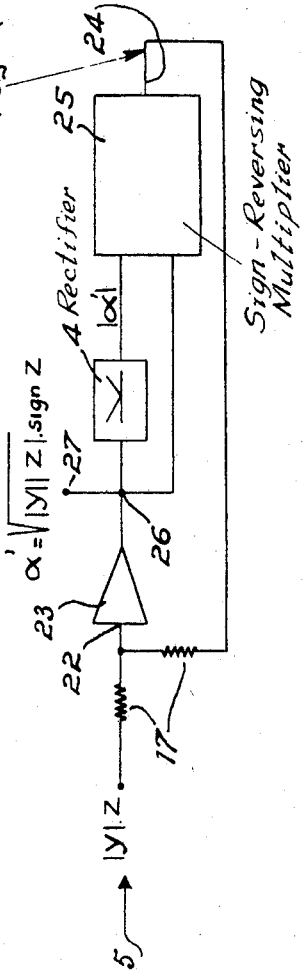
FIG. 3 is a diagram of a square-root extraction loop which can be advantageously employed in the installation of FIG. 1.

Referring to FIG. 3, the product $y$ $z$ enters with its sign at the hot point 22 of an operational amplifier 23, which hot point is also connected to the output of the sign-reversing multiplier 25. At the point of connection 26 there is collected the value $\alpha' = \sqrt{|y||z|}$ sign $z$ desired and transmitted from 27 to the servo-motor 7 (FIG. 1), this connection point being coupled to the two inputs of the multiplier, one of the input lines being provided with a rectifier 4 in order to retain the sign of $z$ during the operation.

It can be seen that the present invention provides an advantageous servo-control device which obviates the usual drawbacks both in purely linear systems and also in conventional non-linear systems, while retaining the useful characteristics of both systems.

It should also be noted that the intermediate variables introduced into the calculation according to the invention are capable of a linear transfer, of internal combinations or pseudo-linear transfers without departing from the scope of the invention.

It will of course be understood that the present invention has been described by way of explanation only and not in any limitative sense and that any modification of detail may be made thereto in conformity with its spirit.

I claim:
1. A servo-control system comprising
    amplitude line means and phase line means connected to simultaneously receive an input signal;
    said amplitude line means including
        linear transfer function means to convert said input signal to a first signal.
    and means to form the absolute value of said first signal;
    said phase line means including
        transfer function means to convert said input signal to a second signal;
    a first operator means connected to said amplitude line means and said phase line means to form a third signal of the absolute value of said first signal multiplied by said second signal;
    a second operator means to form a signal of the square root of said third signal multiplied by the sign of said second signal.

2. The servo-control system according to claim 1, wherein
    said amplitude line means forms an absolute value of at least one additional signal analogous to said first signal;
    said first operator means issues a signal product of said absolute values of at least one additional signal and said third signal;
    and said second operator means extracts a root of the very degree of said signal product to issue an output of the degree one of the input signal.

3. The servo-control system according to claim 1, wherein
    a course deviation supply and transmitting means is connected to said amplitude and phase line means;
    and a servo-mechanism is connected to receive the output from said second operator means.

4. The servo-control system according to claim 2, wherein
    a course deviation supply and transmitting means is connected to said amplitude and phase line means;
    and a servo-mechanism is connected to receive the output from said second operator means.

5. A servo-control system comprising
    a course deviation supply and transmitting means to supply an input signal;
    analogue circuit means to generate linear transfer functions of said input signal;
    multiplier circuit means to form a product signal of said linear transfer functions and determine the sign of the product of said functions connected to said analogue circuit means;
    a loop means to extract the square root of said product connected to said multiplier circuit means;
    and a servo-control mechanism connected to said loop means to receive an intermediate variable constituted by said extracted square root.

References Cited

UNITED STATES PATENTS

| | | | |
|---|---|---|---|
| 2,701,328 | 2/1955 | Woodruff | 318—448 XR |
| 2,714,185 | 7/1955 | Woodruff | 318—18 |
| 2,954,514 | 9/1960 | Hemstreet | 318—448 XR |
| 3,273,035 | 9/1966 | Inderhees | 318—18 |
| 3,310,721 | 3/1967 | Moller | 318—489 XR |

BENJAMIN DOBECK, Primary Examiner

U.S. Cl. X.R.

318—28

UNITED STATES PATENT OFFICE

CERTIFICATE OF CORRECTION

Patent No. 3,504,247                         March 31, 1970

Bernard Maurice Hamel

It is certified that error appears in the above identified patent and that said Letters Patent are hereby corrected as shown below:

In the heading to the printed specification, line 4, "d'Equipments" should read -- d'Equipements --.

Signed and sealed this 15th day of December 1970.

(SEAL)
Attest:

Edward M. Fletcher, Jr.                       WILLIAM E. SCHUYLER, JR.
Attesting Officer                                Commissioner of Patents